United States Patent [19]

Charatis

[11] Patent Number: 5,065,108
[45] Date of Patent: Nov. 12, 1991

[54] REGENERATIVE CAVITY X-RAY LASING AMPLIFIER

[75] Inventor: George Charatis, Ann Arbor, Mich.

[73] Assignee: KMS Fusion, Inc., Ann Arbor, Mich.

[21] Appl. No.: 367,310

[22] Filed: Jun. 16, 1989

[51] Int. Cl.$^5$ .......................... H01S 3/09; H01S 3/30
[52] U.S. Cl. ................................ 359/333; 372/5; 372/70
[58] Field of Search .................. 372/5, 18, 70, 108; 330/4.3

[56] References Cited

U.S. PATENT DOCUMENTS

| | | | |
|---|---|---|---|
| 3,617,939 | 11/1971 | Bond et al. | 372/5 |
| 4,229,708 | 10/1980 | Mania et al. | 372/5 |
| 4,425,652 | 1/1984 | Mourou | 372/18 |
| 4,589,113 | 5/1986 | Hagelstein | 372/5 |
| 4,630,274 | 12/1986 | Schafer | 372/108 |
| 4,896,119 | 1/1990 | Williamson et al. | 330/4.3 |
| 4,914,663 | 4/1990 | Basu et al. | 372/18 |

OTHER PUBLICATIONS

Wang et al., "Generation of Coherent. . . Laser Amplifier", Pat. J. Electron (UK), vol. 65, #3, pp. 589–595, 9/88, abst. provided.
Wang et al., "Generation of. . . Laser Amplifier", NTIS DR 88009137/XAB, 6/1/87, Abst. Only Provided.
Hawryluk et al., "Application of X-Ray Laser Cavities", J. Vac. Sci. Tech. B6 (6), 11/12-88, pp. 2153–2157.
Ceglio et al., "Multipass Amplification. . . Laser Cavity", Optics Letters, vol. 13, #2, 2/88, pp. 108–110.
Mehr et al., "Use of Metastable. . . X-Ray Laser", Optics Communications, vol. 10, #3, 3/74, pp. 227–228.

Primary Examiner—Nelson Moskowitz
Attorney, Agent, or Firm—Barnes, Kisselle, Raisch, Choate, Whittemore & Hulbert

[57] ABSTRACT

A regenerative cavity X-ray lasing oscillator and method in which an X-ray laser target is positioned between a pair of opposed coaxial mirrors at predetermined fixed spacing and forming an X-ray cavity. A series of light pulses is directed onto the target surface at predetermined fixed time intervals that correspond to spacing between the mirrors. Each light pulse ablates a portion of the target surface to form an ion plasma adjacent to the target surface of a character and composition for spontaneous emission of X-ray energy along the axis of the cavity. Such X-ray energy oscillates in the cavity and is amplified upon each passage through the plasma. One of the mirrors is constructed for extracting the amplified X-ray laser energy from the cavity.

14 Claims, 2 Drawing Sheets

REGENERATIVE CAVITY X-RAY LASING AMPLIFIER

The present invention is directed to X-ray lasers, and more particularly to a method and apparatus for boosting or amplifying X-ray laser output.

U.S. Pat. Nos. 4,731,786 and 4,827,479 disclose X-ray lasers in which a flat target surface of selected composition, such as selenium, is illuminated by a high-intensity laser beam to ablate a portion of the target surface and form a generally cylindrically shaped plasma adjacent to the target surface. This plasma contains neon-like ions that spontaneously emit X-ray radiation along a line orthogonal to the illumination axis and parallel to the axis of the cylindrical plasma. It is a general object of the present invention to provide an X-ray lasing amplifier and method, of the type disclosed in the noted patents, that provide enhanced laser gain and efficiency.

The invention, together with additional objects, features and advantages thereof, will be best understood from the following description, the appended claims and the accompanying drawings in which:

The disclosures of U.S. Pat. Nos. 4,731,786 and 4,827,479 are incorporated herein by reference for background discussion of X-ray laser structure, theory and operation.

Figure 1:
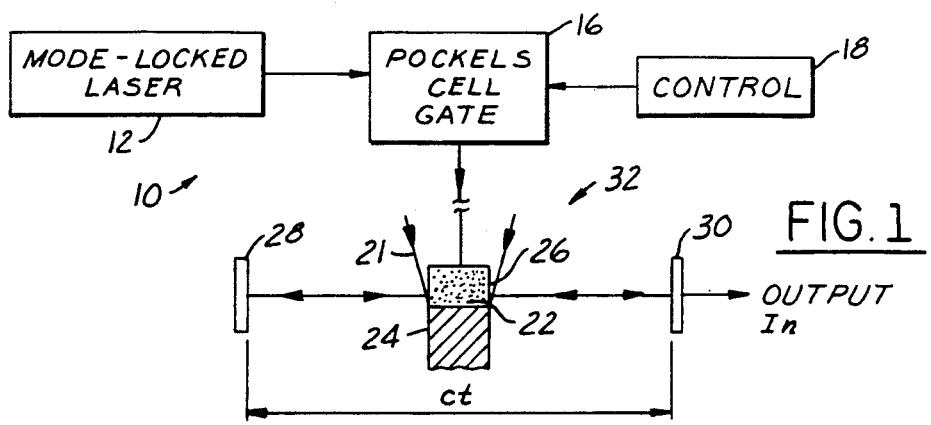
FIG. 1 is a functional block diagram of an X-ray laser in accordance with one presently preferred embodiment of the invention.
Figure 2:
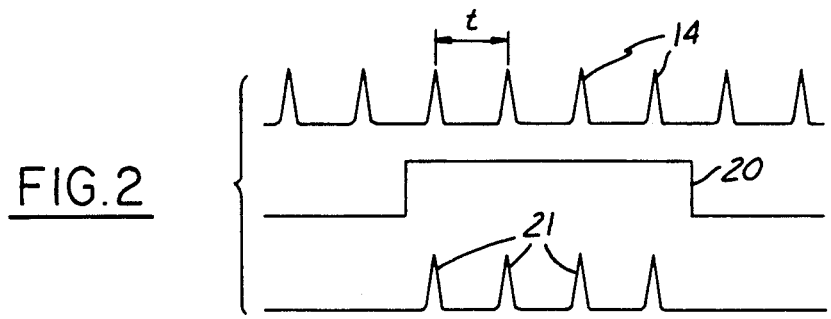
FIG. 2 is a graphic illustration of various timing and control pulses useful in describing operation of the embodiment of the invention illustrated in FIG. 1.

In a first laser system 10 (FIG. 1) in accordance with the present invention, a mode-locked laser 12 provides a continuing series of output light pulses 14 (FIG. 2) at uniform inter-pulse spacing t (FIG. 2) determined by laser cavity length. A Pockels cell gate 16 receives the pulses 14 from laser 12 and is responsive to a signal 20 from a suitable control 18 for gating or passing a preselected number of pulses 21 (FIG. 2). These pulses 21, suitably shaped and amplified, are directed onto the surface 22 of a target 24 for generating a plasma 26 of neon-like ions in a cylindrical cloud adjacent to the target surface. Target 24 is positioned between a pair of opposed coaxial X-ray mirrors 28, 30 at fixed spacing ct equal to the inter-pulse time interval t multiplied by speed of light c. The axis of mirrors 28, 30 is spaced from target surface 22 at a position to be approximately coaxial with plasma 26. Amplified light pulses 21 thus produce spontaneous X-ray emissions within plasma 26 along the axis of mirrors 28, 30 during each pulse of the train. Mirrors 28, 30 and target plasma 26 thus form a multi-pass oscillator cavity 32.

Figure 4:
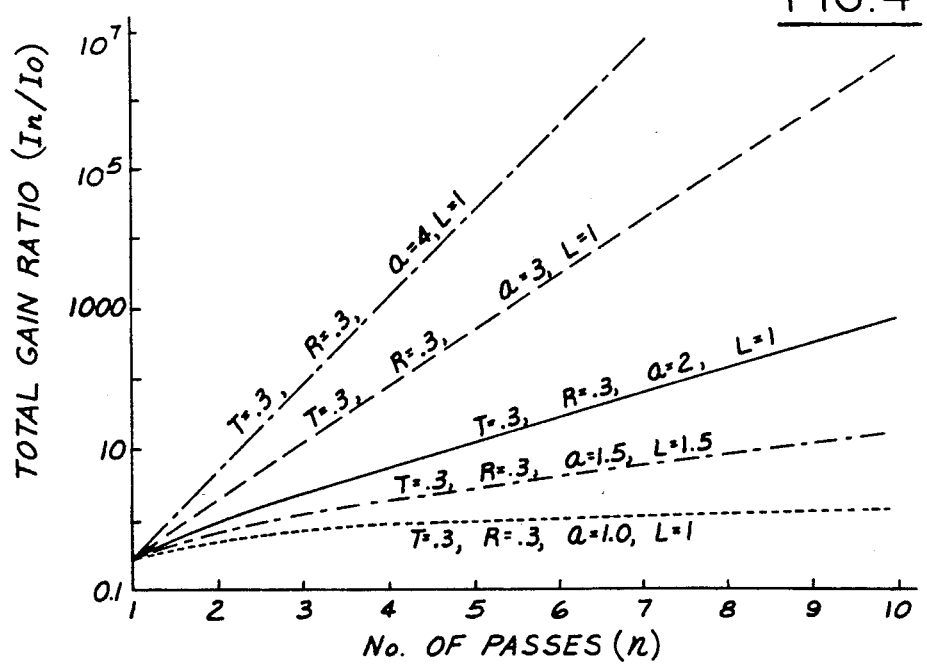
FIG. 4 is a graph that illustrates output characteristics of the embodiment of the invention illustrated in FIG. 1.

With target 24 positioned within cavity 32 formed by mirrors 28, 30, whose length is exactly equal to the inter-pulse interval, the X-ray lasing emission generating during each radiation pulse is synchronized to oscillations within the lasing cavity, so that the oscillating lasing energy gets boosted or amplified during each passage through the plasma. At least one of the mirrors 30 is partially transmissive for extracting output energy. The following equation relates intensity gain ratio of output laser energy to the other parameters of cavity 32:

$$\frac{In}{Io} = \sum_{i=1}^{n} T(Re^{aL})^{i-1}$$

where Io equals intensity of X-ray emission at plasma 26 responsive to each pulse 21, R is reflectivity of mirrors 28, 30, T is mirror transmissivity, a is a gain co-efficient, and L is length of the plasma gain medium along the axis of mirrors 28, 30. As shown in FIG. 4, for a mirror reflectivity R equal to thirty percent and a transmissivity T equal thirty percent, and a gain-length product aL equal to two, intensity increase for n equal to ten passes is approximately 1,000. For a gain-length product aL equal to three, the intensity increase for ten passes is over $10^6$.

Figure 3:
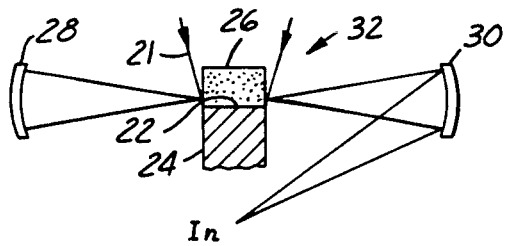
FIG. 3 is a fragmentary functional block diagram of a modified embodiment of the invention.
Figure 5:
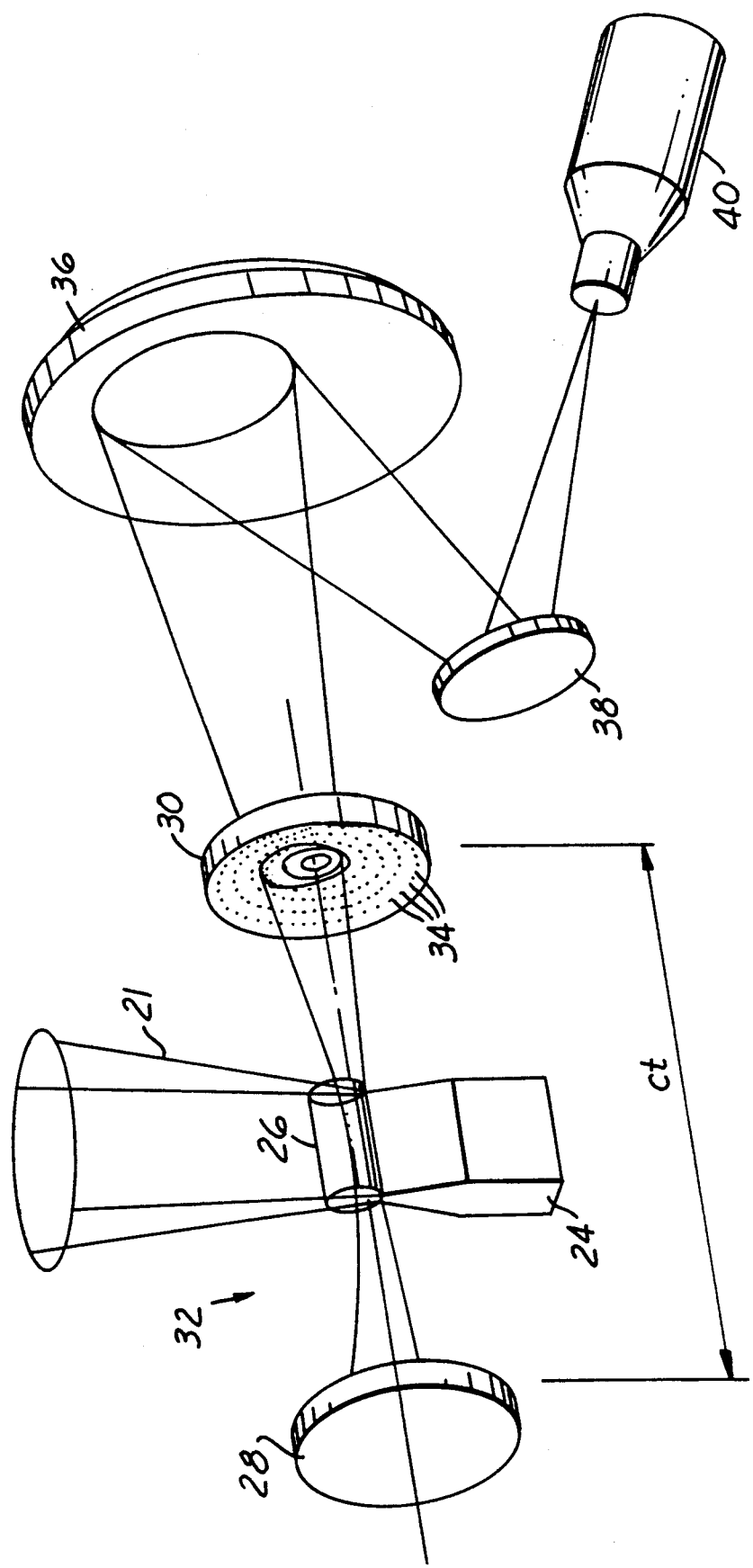
FIG. 5 is a fragmentary functional block diagram of another embodiment of the invention.

FIG. 3 illustrates a modified embodiment of the invention wherein the cavity 32 is formed by a pair of spherical mirrors 28, 30 that are axially opposed to and aligned with each other, and are confocal adjacent to the surface 22 of target 24 positioned midway therebetween. Spherical reflectors 28, 30 help control cavity energy upon occurrence of density gradients within plasma 26. Output extraction is accomplished by forming mirror 30 as a grating that reflects zero-order X-ray radiation toward the opposing mirror 28, while reflecting one of the higher orders of radiation out of the cavity a intensity In. FIG. 5 illustrates another embodiment of the invention in which mirror 30 is provided with a multiplicity of small holes through which a portion of the X-ray energy passes to a reflector 36, while the remainder is reflected through plasma 26 to mirror 28. Energy incident on mirror 36 is reflected onto a mirror 38, and thence onto a detector 40.

Target 24 may be of any suitable construction that will generate and sustain a plasma 26 between mirror 28, 30. Solid targets are appropriate because the plasma formed by each light pulse is reproducible in space and time. A slot-orifice gas jet target is also suitable. The following table illustrates, for various target materials (Z), and exemplary lasing and output parameters:

| Z | Lasing (λA) | Intensity (W/cm²) | Plasma Length (mm) | Energy (joules) | Pulse Length (ps) | No. of Pulses |
|---|---|---|---|---|---|---|
| C | 182 | $5 \times 10^{12}$ | 10 | 6 | 100 | 83 |
| F | 81 | $2 \times 10^{13}$ | 10 | 20 | 20 | 25 |
| Na | 54 | $3 \times 10^{13}$ | 10 | 36 | 20 | 13 |
| Mg | 45 | $4 \times 10^{13}$ | 10 | 48 | 20 | 10 |
| Al | 39 | $5 \times 10^{13}$ | 10 | 60 | 20 | 8 |
| Se | 209 206 | $5 \times 10^{13}$ | 5 | 120 | 450 | 4 |

The invention claimed is:

1. An X-ray laser amplifier that includes: means for providing a series of high-power light pulses at uniform temporal spacing, and an X-ray laser cavity including a pair of reflective means spaced from each other by a distance that corresponds to temporal spacing between said light pulses and a target positioned to be illuminated by said light pulses between said reflective means, said target being of a character and structure to from a plasma of ions in response to illumination by said light pulses for spontaneous emission of X-ray radiation between said reflective means, such that amplitude of X-ray emissions from said plasma is boosted upon each passage through said plasma, at least one of said reflective means being constructed for extraction of amplified X-ray energy from said cavity.

2. The amplifier set forth in claim 1 wherein said reflective means comprises spherical mirrors.

3. The amplifier set forth in claim 2 wherein said target is positioned mid-way between said mirrors, said mirrors being confocal at said target.

4. The amplifier set forth in claim 3 wherein said at least one reflective means comprises a spherical mirror/grating for reflecting zero-order radiation toward the other mirror within said cavity and reflecting a higher order radiation out of said cavity.

5. The amplifier set forth in claim 1 wherein said at least one reflective means comprises a partially transparent mirror.

6. The amplifier set forth in claim 1 wherein said pulse-providing means comprises a mode-locked laser.

7. An X-ray laser that comprises a target and means for directing high-power laser radiation onto said target to form a plasma of ions at a density and temperature for spontaneous emission of X-ray energy along an axis at predetermined orientation with respect to said target, characterized in that said radiation-directing means comprises means for directing a series of high-power laser pulses onto said target at predetermined constant temporal spacing, and
in that said laser further includes a pair of reflective means positioned on opposite sides of said target along said axis and forming a cavity having a length corresponding to said temporal spacing, one of said reflective means being constructed for extraction of X-ray laser energy from said cavity.

8. The laser set forth in claim 7 wherein said radiation-directing means comprises a mode-locked laser for producing a continuing series of light pulses at said predetermined constant temporal spacing, and means for extracting a preselected number of said pulses and directing the same onto said target, said preselected number being coordinated with desired amplification of X-ray radiation.

9. The laser set forth in claim 8 wherein said reflective means comprises spherical mirrors, said target being positioned mid-way between said mirrors and said mirrors being confocal adjacent to said target.

10. The laser set forth in claim 9 wherein one of said mirrors comprises a spherical mirror/grating for reflecting zero-order radiation toward the other mirror within said cavity and reflecting a higher order of radiation out of said cavity.

11. The laser set forth in claim 8 wherein said at least one reflective means comprises a partially transparent mirror.

12. A method of generating high-power X-ray laser energy comprising the steps of:
(a) providing an X-ray laser cavity that includes a pair of opposed coaxial mirrors at predetermined fixed spacing and a target having a surface positioned between said mirrors,
(b) directing a series of light pulses onto said target surface at predetermined fixed time intervals and an intensity sufficient to form an ion plasma adjacent to said surface of a character and composition for spontaneous emission of X-ray energy along the axis of said cavity, said fixed spacing between said mirrors being equal to said time intervals multiplied by the velocity of light such that X-ray energy oscillating in said cavity is amplified upon each passage through said plasma, and
(c) extracting a portion of said X-ray energy oscillating in said cavity.

13. The amplifier set forth in claim 1 wherein said at least one reflective means comprises a mirror having a plurality of apertures positioned to transmit a portion of said X-ray energy through said apertures while reflecting the remainder of said energy toward the other said reflective means.

14. The laser set forth in claim 11 wherein said at least one reflective means comprises a mirror having a plurality of apertures positioned to transmit a portion of said X-ray energy through said apertures while reflecting the remainder of said energy toward the other said reflective means.

* * * * *